(12) United States Patent
Druliner

(10) Patent No.: US 7,739,826 B1
(45) Date of Patent: Jun. 22, 2010

(54) FLAPPING DECOY

(76) Inventor: Jim Druliner, 444 N. 38th St., Omaha, NE (US) 68131

(*) Notice: Subject to any disclaimer, the term of this patent is extended or adjusted under 35 U.S.C. 154(b) by 286 days.

(21) Appl. No.: 11/593,944

(22) Filed: Nov. 8, 2006

(51) Int. Cl.
*A01M 31/06* (2006.01)

(52) U.S. Cl. .................................. 43/3; 43/2

(58) Field of Classification Search .............. 43/2, 43/3; D10/59
See application file for complete search history.

(56) References Cited

U.S. PATENT DOCUMENTS

| | | | | |
|---|---|---|---|---|
| 74,458 | A * | 2/1868 | Wales | 43/3 |
| 378,410 | A * | 2/1888 | Trimble | 43/3 |
| 547,553 | A * | 10/1895 | Keller | 43/3 |
| 740,293 | A * | 9/1903 | Loeble | 43/3 |
| 1,083,882 | A * | 1/1914 | Hindmarsh | 43/3 |
| 2,028,849 | A * | 1/1936 | Shay | 43/3 |
| 2,349,417 | A * | 5/1944 | Gene | 244/154 |
| 2,413,418 | A * | 12/1946 | Rulison | 43/3 |
| 2,442,417 | A * | 6/1948 | Lang | 244/153 R |
| 2,501,517 | A * | 3/1950 | Honald | 43/1 |
| 2,507,777 | A * | 5/1950 | Frey | 244/153 R |
| 2,663,108 | A * | 12/1953 | Dixon et al. | 43/3 |
| 2,747,316 | A * | 5/1956 | Benedetto | 43/3 |
| 2,752,715 | A * | 7/1956 | Miller | 43/3 |
| 2,909,859 | A * | 10/1959 | Christmas | 43/3 |
| 3,435,550 | A * | 4/1969 | Carlson | 43/3 |
| 3,537,205 | A * | 11/1970 | Robert | 43/3 |
| 3,869,823 | A * | 3/1975 | Powers et al. | 43/3 |
| 4,228,977 | A * | 10/1980 | Tanaka | 244/153 R |
| 4,896,448 | A * | 1/1990 | Jackson | 43/3 |
| 4,911,384 | A * | 3/1990 | Stankus | 244/153 R |
| 5,144,764 | A * | 9/1992 | Peterson | 43/3 |
| 5,191,730 | A * | 3/1993 | Balmer | 43/3 |
| 5,524,851 | A * | 6/1996 | Huang | 244/153 R |
| 5,682,702 | A * | 11/1997 | McKnight et al. | 43/3 |
| 5,960,577 | A * | 10/1999 | Walterson | 43/3 |
| 6,095,458 | A * | 8/2000 | Cripe | 244/153 R |
| 6,349,902 | B1 * | 2/2002 | Cripe | 244/153 R |
| 7,028,429 | B1 * | 4/2006 | Druliner | 43/3 |
| 2004/0025400 | A1 * | 2/2004 | Salato | 43/3 |
| 2009/0229163 | A1 * | 9/2009 | Latschaw | 43/2 |

FOREIGN PATENT DOCUMENTS

| | | | |
|---|---|---|---|
| EP | 1279333 A2 * | 1/2003 | |
| GB | 2067064 A * | 7/1981 | |
| GB | 2124464 A * | 2/1984 | |

* cited by examiner

*Primary Examiner*—Darren W Ark
(74) *Attorney, Agent, or Firm*—Patent & Trademark Services, Inc; Joseph H. McGlynn

(57) ABSTRACT

A bird decoy with its wings extended. A pocket is attached to the underside of each wing and slits are placed adjacent the forward edges of the wings. A stiffly flexible rod is threaded through the slits and the ends are secured in the pockets. Additional slits are placed on the trailing end of the wings.

4 Claims, 1 Drawing Sheet

FLAPPING DECOY

BACKGROUND OF THE INVENTION

This invention relates, in general, to decoys, and, in particular, to a decoy that moves due to environmental forces.

DESCRIPTION OF THE PRIOR ART

In the prior art various types of decoys have been proposed. For example, U.S. Pat. No. 3,435,550 to Carlson discloses a decoy with extended wings with a pair of rods to hold the wings to the body.

U.S. Pat. No. 5,191,730 to Balmer discloses a decoy with inflatable wings with extension rods to hold the wings in an extended position.

U.S. Pat. No. 5,682,702 to McKnight et al discloses a decoy with extended wings.

U.S. Pat. No. 7,028,429 to Druliner discloses a decoy mounted on a stake with springy characteristics.

Hunters often use decoys to bring birds within shooting range. It is generally agreed that the more life-like the decoys are, the better. Some form of motion or body movement, such as wing flapping, makes decoys better suited to their task. Decoys with movable wings have been manually operated by pull lines or motorized means. However, manually operated pull lines only work when you are pulling them, and mortised means can become corroded, or lose there power (i.e. their batteries go dead).

The present invention is designed to overcome the shortcomings of the prior art. The present invention does not use manually operated pull lines or a mechanical mortised means. Instead it uses air currents to move the wings of the decoy to simulate a real bird.

SUMMARY OF THE INVENTION

The present invention is directed to a bird decoy with its wings extended. A pocket is attached to the underside of each wing and slits are placed adjacent the forward edges of the wings. A stiffly flexible rod is threaded through the slits and the ends are secured in the pockets. additional slits are placed on the trailing end of the wings.

It is an object of the present invention to provide a new and improved decoy which appears to be a bird in flight.

It is an object of the present invention to provide a new and improved decoy which appears to be a bird flapping its wings.

It is an object of the present invention to provide a new and improved decoy which can be set up and taken down quickly and easily.

These and other objects and advantages of the present invention will be fully apparent from the following description, when taken in connection with the annexed drawings.

DESCRIPTION OF THE PREFERRED EMBODIMENT

Figure 1:
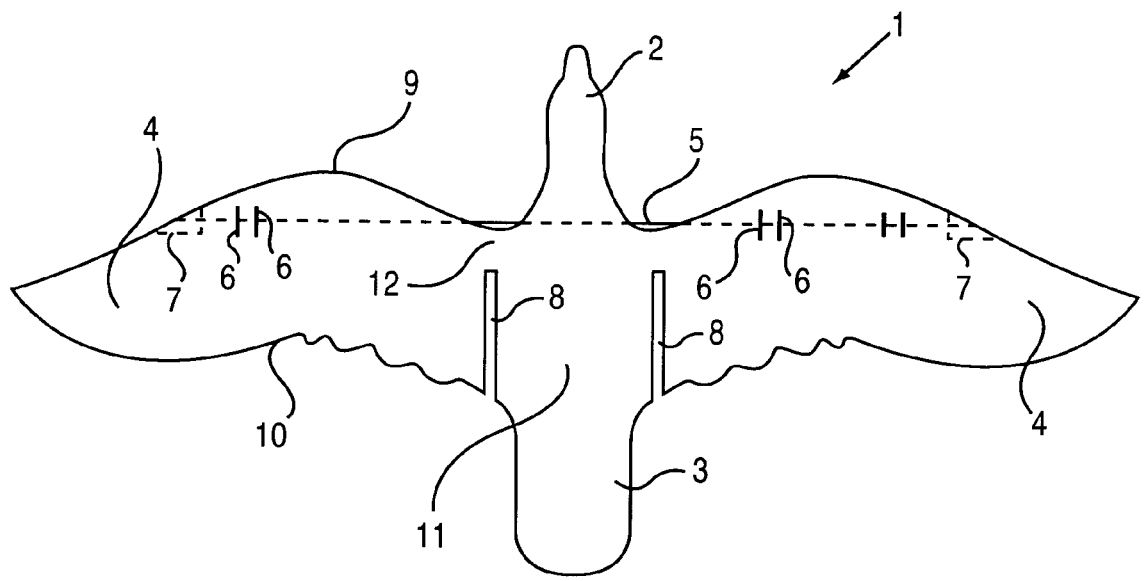
FIG. 1 is top view of the present invention.

Referring now to the drawings in greater detail, FIG. 1 shows a decoy 1 constructed under the guidelines of the present invention. The decoy 1 appears to be a bird, such as a waterfowl, with its wings extended, as through it were flying. The decoy has a head portion 2 adjacent the forward edges 9 of the wings 4. The decoy has a tail portion 3 adjacent the trailing edges 10 of the wings 4. Although the present invention is shown as a water fowl, any shape can be used without departing from the scope of the present invention. In addition, the material chosen for the body and wings can be any material that will serve the intended function of the body and wings.

The wings have a plurality of slits 6 positioned adjacent the forward edge 9 of the wings 4. The slits 6 extend through the surface of the wings from the top surface through the bottom surface. The exact number of the slits is not important as long as there are enough to support the rod 5. The slits are arranged in pairs so there are two slits closely adjacent to each other. A rod 5 is threaded through the slits 6 so the rod passes through the first of the closely adjacent slits from the top of the wing to the bottom of the wing. Then the rod is passed from the bottom of the wing, through the second of the closely adjacent slits to the top of the wing. The rod is then threaded through all of the other slits 6 along the leading edge 9 of the wing 4.

The rod 5 is made from a stiffly flexible material so it will provide stiffness to the wings to hold them in an open position as shown in FIG. 1, however, the rod must have some flexibility so the wings can move, as will be explained in more detail below.

Figure 2:
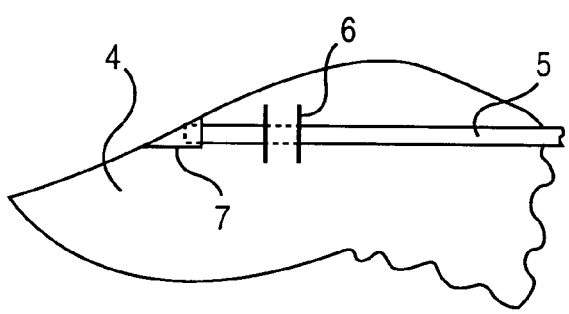
FIG. 2 is a partial view of the underside of the wing of the present invention.
Figure 3:
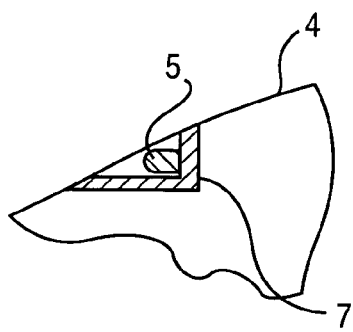
FIG. 3 is a partial view of the present invention showing the engagement of the rod in the pocket.

FIGS. 2 and 3 show how the rod 5 is secured to the ends of the wings 4. A pocket 7 is secured to the underside of the wings. The preferred method of securing the pocket 7 is to sew the pocket along three sides to the wing, thereby leaving one open side. Even though sewing is the preferred method of attachment, any conventional method can be used without departing from the scope of the invention. The open side of the pocket will be the side facing a body portion 11 of the bird so the end of the rod 5 can be slid into the open side of the pocket when the decoy is being set up by threading the rod 5 through the slits 6 in the wings.

The trailing edges 10 of the wings 4 have a pair of slots 8 closely adjacent the body 11 of the decoy. The slots 8 will partially separate the wings 4 from the body 11 of the decoy. The remaining material 12 holding the wings to the body will act like a living hinge. The slots 8 and the hinge 12 will allow the wings to flap when air hits the forward edge 9 of the wings. The rod 5 will hold the wings in an open position, but will still allow the wings to flap under the influence of the wind. The flapping of the wings will simulate a live bird and make the decoy more life-like, thus enabling it to be more effective.

The decoy can be mounted using any conventional method such as, but not limited to, a springy stake, as shown in U.S. Pat. No. 7,028,429, to Druliner, which is hereby incorporated by reference. Any other mounting means can be used as long as it does not interfere with the flapping of the wings 4.

Although the Flapping Decoy and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A decoy comprising:
   a head portion, a body portion and wings,
   means for joining said wings to said body portion,
   said wings each having a forward edge and a trailing edge, said means joining said wings to said body portion being adjacent said forward edge,
means for holding said wings in an extended position,
said means for holding said wings in an extended position comprising pockets mounted to said wings,
said means for holding said wings in an extended position also comprise a plurality of slits, and
a rod extending through said slits, and mounted in said plurality of slits and said pockets, and
said rod is made of a stiffly flexible material, and
wherein said wings have a pair of slots which separate first portions of said wings from said body portion, each slot of said pair of slots being defined by two parallel sides, said pair of slots start at said trailing edges of said wings and extend toward said forward edges and terminate at locations between said trailing and forward edges, said means for joining said wings to said body portion comprising second portions of said wings which remain attached to said body portion and which are defined between said terminating locations of said pair of slots and said forward edges, said second portions constituting living hinges, and
wherein said trailing edges of said wings are uninterrupted edges except for said pair of slots located rearwardly of said means for joining said wings to said body portion.

2. The decoy as claimed in claim 1, wherein said pockets have three closed sides and one open side, and
said open side faces said body portion.

3. A decoy comprising:
a head portion, a body portion and wings,
means for joining said wings to said body portion comprising hinges,
said wings each having a forward edge and a trailing edge,
said means joining said wings to said body portion being adjacent said forward edges for holding said wings in an extended position, and
comprising pockets mounted to an underside of said wings,
said means for holding said wings in an extended position comprise a plurality of slits, and
a single, one piece rod extending through said slits, and mounted only in said plurality of slits and said pockets,
wherein said slits are arranged in pairs, and
said rod is made of a stiffly flexible material, and
wherein said wings have a pair of slots which separate first portions of said wings from said body portion, each slot of said pair of slots being defined by two parallel sides, said pair of slots start at said trailing edges of said wings and extend toward said forward edges and terminate at locations between said trailing and forward edges, said hinges comprising second portions of said wings remaining attached to said body portion and defined between said terminating locations of said pair of slots and said forward edges, said second portions constituting living hinges, and
wherein said trailing edges of said wings are solid, interrupted edges except for said pair of slots located rearwardly of said hinges, which separate at least a portion of said wings from said body portion.

4. The decoy as claimed in claim 3, wherein said pockets have three closed sides and one open side, and
said open side faces said body portion.

\* \* \* \* \*